United States Patent
Matsunaga

(10) Patent No.: US 9,698,933 B2
(45) Date of Patent: Jul. 4, 2017

(54) COMMUNICATION DEVICE AND COMMUNICATION METHOD

(71) Applicant: Oki Electric Industry Co., Ltd., Tokyo (JP)

(72) Inventor: Toshihiko Matsunaga, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 42 days.

(21) Appl. No.: 14/973,710

(22) Filed: Dec. 17, 2015

(65) Prior Publication Data

US 2016/0191229 A1    Jun. 30, 2016

(30) Foreign Application Priority Data

Dec. 25, 2014  (JP) ................................ 2014-262720

(51) Int. Cl.
| | |
|---|---|
| *H04L 1/00* | (2006.01) |
| *H04W 52/02* | (2009.01) |
| *H04W 56/00* | (2009.01) |

(52) U.S. Cl.
CPC ........... *H04L 1/00* (2013.01); *H04W 52/0219* (2013.01); *H04W 56/00* (2013.01); *H04W 56/001* (2013.01); *Y02B 60/50* (2013.01)

(58) Field of Classification Search
CPC .. H04L 1/00; H04W 56/001; H04W 52/0219; H04W 56/00; Y02B 60/50
See application file for complete search history.

(56) References Cited

U.S. PATENT DOCUMENTS

2012/0250671 A1* 10/2012 Kawamoto ............. H04L 29/06 370/345
2012/0314739 A1* 12/2012 Bhadra ............... H04W 40/246 375/219

OTHER PUBLICATIONS

"Part 15.4: Low-Rate Wireless Personal Area Networks (LR-WPANs)", IEEE Std 802.15.4e-2012 Chapter 5.1.11.1) Corresponding pages are pp. 51 to 53, and 181, Apr. 16, 2012.

* cited by examiner

*Primary Examiner* — Mohammad Anwar
(74) *Attorney, Agent, or Firm* — Rabin & Berdo, P.C.

(57) ABSTRACT

The present disclosure provides a communication device, including: a reception section that receives information relating to a reception timing at a reception side, which is transmitted from a transmission destination after a data frame is transmitted to the transmission destination; an information storage section that stores a transmission interval and the information relating to the reception timing for previous transmissions; a mismatch correction section that, in a case in which a new data frame is transmitted, calculates a correction amount for eliminating a mismatch in a transmission timing of a wakeup frame or a mismatch in a reception timing at which the transmission destination receives the wakeup frame, based on the transmission interval and the information relating to the reception timing; and a communication control section that determines the transmission or reception timing based on the information relating to the reception timing and the correction amount.

11 Claims, 6 Drawing Sheets

FIG.2

| TIME | DESTINATION ADDRESS F1 | MAXIMUM TRANSMISSION INTERVAL (MINUTE) F2 | CORRECTION AMOUNT AT MAXIMUM TRANSMISSION INTERVAL (SECOND) F3 | CSL PHASE (SECOND) F4 | LAST TRANSMISSION TIME F5 |
|---|---|---|---|---|---|
| ts1 | 2222 | – | – | 0.1 | ts1 |
| ts2 | 2222 | – | – | – | – |
| te1 | 2222 | – | – | 0 | te1 |
| te2 | 2222 | 10 | 0.1 | 0.1 | te2 |
| ts3 | 2222 | 20 | 0.2 | 0 | ts3 |
| ts4 | 2222 | 40 | 0.4 | 0 | ts4 |

COMMUNICATION DEVICE AND COMMUNICATION METHOD

CROSS-REFERENCE TO RELATED APPLICATION

This application claims priority under 35 USC 119 from Japanese Patent Application No. 2014-262720, filed on Dec. 25, 2014, the disclosure of which is incorporated by reference herein.

BACKGROUND

Technical Field

The present disclosure relates to a communication device and a communication method that are, for example, applicable to a system in which wireless communication devices autonomously synchronize with each other to define communication timings for exchanging data.

Related Art

For example, nodes (wireless communication devices) configuring a sensor network are configured to perform power-saving communication. A representative method for power-saving communication is a method in which a reception node intermittently operates. For example, CSL (Coordinated Sampled Listening) is a communication standard employing the reception node intermittent operation method for the reception node (see Chapter 5. 1. 11. 1 in the IEEE Std 802. 15. 4e-2012).

FIG. 5 is a timing chart illustrating an outline of data communication operations in CSL.

An CSL reception period (CSL Period), a maximum CSL reception period (MaxCSL Period), and a startup time (also called "wakeup frame reception period") are previously set for each node. The maximum CSL reception period is the maximum time for repeatedly transmitting wakeup frames (maximum wakeup frame transmission time) when seen from a transmission node. The startup time is a reception standby time in which a reception node is waked up.

A transmission node S that transmits the data first performs a data transmission operation in an asynchronous communication mode. The operation in the asynchronous communication mode is as follows. The transmission node S repeatedly transmits wakeup frames to the reception node R during the maximum CSL reception period. A wakeup frame includes a rendezvous time (RZTime) indicating the remaining time until data transmission. The rendezvous time decreases each time the wakeup frame is transmitted. The transmission node S repeatedly transmits the wakeup frames during the maximum CSL reception period, and then transmits a data frame to the node R.

The node R enters the reception standby state only in the wakeup frame reception period within one CSL reception period, and enters the sleep state in which the node R does not perform the reception operation in other periods.

In a case in which the node R receives a wakeup frame WU3 from the node S in the reception standby state W2, the node R acquires the rendezvous time in the frame WU3. Then, the node R stops the reception operation until right before the rendezvous time, and enters the reception standby state W3 immediately before the rendezvous time. Accordingly, the node R receives a data frame D1 from the node S.

In a case in which the node R receives the data frame D1, the node R returns a reception acknowledge frame ACK1 to the node S. Note that, an CSL reception period, and an CSL phase indicating a mismatch in the reception timing (a mismatch between the reception standby states W2 and W3, and the CSL reception period) are inserted into the reception acknowledge frame ACK1. In other words, the CSL phase indicates a mismatch between a synchronization information time and a reception time in the wakeup frame, and is a correction amount (synchronization correction amount) designated by the reception node R side, in order to keep synchronization with the reception node R at the transmission node S side.

In a case in which the node S has not received the reception acknowledge frame ACK1 from the node R, the node S repeatedly transmits the wakeup frames to the node R again in the asynchronous communication mode, also during next data transmission, and then transmits the data.

In a case in which the node S receives the reception acknowledge frame ACK1 from the node R, the node S enters the synchronous transmission mode. The node S holds the CSL reception period and the CSL phase included in the reception acknowledge frame ACK1, and corrects the synchronization with the node R. The node S then transmits a wakeup frame WU6 with a corrected transmission timing, during next data transmission to the node R. The wakeup frame WU6 is transmitted in consideration with a difference in clock accuracy between the timers of the two nodes S and R while the synchronous transmission mode is established, and the transmission is performed only in a shorter period ST than the maximum CSL reception period (Note that FIG. 5 illustrates that only one frame is transmitted, but plural frames may be repeatedly transmitted during the short period ST. The short period ST will be called below "wakeup frame transmission period").

In a case in which a reception acknowledge frame ACK is not returned from the reception node R even in the synchronous communication mode, the transmission node S transits to the asynchronous communication mode, and performs the transmission operation in the asynchronous communication mode during next data transmission.

However, in the conventional communication device, the power saving effect and the synchronization accuracy are in a trade-off relationship, since an internal clock (timer) of each node temporarily synchronizes and then updates a time by its own generated clock. Namely, power saving in the reception node R becomes more effective, as the wakeup frame reception period becomes shorter. On the other hand, in a case in which the wakeup frame reception period is shortened, receiving of the wakeup frames becomes difficult, due to a synchronization mismatch between the internal clocks of the two nodes, or the like.

Each time a data frame is communicated in the synchronous communication mode, the transmission node and the reception node are synchronized with each other, and thus, synchronization mismatch is eliminated. However, in a case in which a new data frame is to be transmitted after long time has elapsed from the previous data frame transmission, a temporal difference caused by synchronization mismatch increases, and thus, a case in which the reception node cannot receive the wakeup frame prior to transmitting a next data frame may occur.

Hereinafter, with reference to FIG. 6, a case in which a wakeup frame cannot be received prior to transmission of a next data frame due to synchronization mismatch, will be described.

A wakeup frame transmission period (note that, the wakeup frame transmission period is not a maximum wakeup frame transmission time) is assumed as 100 milliseconds. (1) of FIG. 6 illustrates a case in which the transmission node S is repeatedly transmitting five wakeup frames WU1 to WU5 during the wakeup frame transmission period. In consideration of synchronization mismatch, it is preferable that the startup time in the reception node R is caused in the middle of the wakeup frame transmission period (at a timing when about 50 milliseconds has elapse from the start time). Further, the transmission node S is assumed to transmit a new data frame after one hour from the previous data frame transmission.

(2) of FIG. 6 illustrates a case in which the internal clock of the reception node R is faster than the internal clock of the transmission node S. Namely, (2) of FIG. 6 illustrates the case in which the internal clock of the reception node R has gained 50 milliseconds faster than the internal clock of the transmission node S during one hour, after the transmission node S has transmitted the data frame previously. In a case in which the two internal clocks completely synchronize with each other, the reception node R enters the wakeup frame reception period (the startup time) when the reception node R can receive the wakeup frame WU3. However, in a case in which the internal clock of the reception node R is 50 milliseconds faster than the internal clock of the transmission node S, the reception node R enters the wakeup frame reception period when the reception node R can receive the first wakeup frame WU1, and thus, receives the wakeup frame WU1. If the internal clock of the reception node R is much faster than the internal clock of the transmission node S, the reception node R cannot receive any of the wakeup frames WU1 to WU5, and transits to the asynchronous communication mode. In the example of FIG. 6, in a case in which the internal clock of the reception node R is over 50 milliseconds faster than the internal clock of the transmission node S, the reception node R cannot receive any of the wakeup frames WU11 to WU15, and transits to the asynchronous communication mode.

(3) of FIG. 6 illustrates a case in which the internal clock of the reception node R is lose than the internal clock of the transmission node S. Namely, (3) of FIG. 6 illustrates the case in which the internal clock of the reception node R has lost about 50 milliseconds behind the internal clock of the transmission node S during one hour, after the transmission node S has transmitted the data frame previously. In a case in which the internal clock of the reception node R is about 50 milliseconds behind than the internal clock of the transmission node S, the reception node R enters the wakeup frame reception period when the reception node R can receive the last wakeup frame WU5, and thus receives the wakeup frame WU5. In a case in which the internal clock of the reception node R is much behind than the internal clock of the transmission node S, the reception node R cannot receive any of the wakeup frames WU1 to WU5, and transits to the asynchronous communication mode. In the example of FIG. 6, in a case in which the internal clock of the reception node R is over 50 milliseconds behind than the internal clock of the transmission node S, the reception node R cannot receive any of the wakeup frames WU1 to WU5, and transits to the asynchronous communication mode.

As illustrated in FIG. 6, for example, in a case in which five wakeup frames are transmitted within 100 milliseconds, the rendezvous time is performed in units of about 20 milliseconds. In this way, in the CSL, there may be cases in which accurate synchronization control cannot be achieved due to coarse time units.

As described above, in the conventional communication device, there may be cases in which secure synchronization between the transmission node and the reception node cannot be achieved, when a data frame transmission interval is long. For example, in a sensor network or the like, a communication interval between the two nodes is longer, and synchronization may not be achieved in a case in which a new data frame is communicated, and consequently, a large number of wakeup frames are transmitted in order to transit to the asynchronous communication mode.

Accordingly, a communication device, a communication device synchronization method, a communication program, and a communication system that may keep synchronous communication even with a long data frame transmission interval are desired.

SUMMARY

A first aspect is a communication device including: a reception section that receives information relating to a reception timing at a reception side, which is transmitted from a transmission destination after a data frame is transmitted to the transmission destination; an information storage section that stores at least a transmission interval and the information relating to the reception timing for one or more previous transmissions, in a synchronous communication mode; a mismatch correction section that, in a case in which a new data frame is to be transmitted, calculates a correction amount for eliminating a mismatch in a transmission timing of a wakeup frame that is transmitted prior to the new data frame or a mismatch in a reception timing at which the transmission destination receives the wakeup frame, based on at least the transmission interval and the information relating to the reception timing; and a communication control section that determines the transmission timing or the reception timing based on the information relating to the reception timing and the correction amount.

A second aspect is a communication device of a transmission side, in which a period for transmitting wakeup frames that are transmitted prior to transmitting data frames is longer in an asynchronous communication mode than in a synchronous communication mode, and that acquires intermittent reception timing information of a communication device of a reception side, which is returned in response to receiving a data frame from the communication device of the transmission side, the communication device including (1) a synchronization information storage section that stores at least an interval between past two transmissions in the synchronous communication mode, and a correction amount that depends on the interval between the two transmissions and is for correcting the intermittent reception timing information of the earlier transmission of the two, (2) an intermittent reception timing information correction section that, in a case in which a new data frame is required to transmit, corrects previous intermittent reception timing information based on a ratio between the transmission interval stored in the synchronization information storage section and an interval between the current and previous transmissions, and the correction amount stored in the synchronization information storage section, and (3) a transmission timing determination section that estimates an intermittent reception timing in the communication device of the reception side based on the corrected previous intermittent reception timing information, and determining a timing for transmitting a wakeup frame on current transmission.

A third aspect is a synchronization method for a communication device of a transmission side, in which a period of transmitting wakeup frames that are transmitted prior to transmitting a data frames is longer in an asynchronous communication mode than in a synchronous communication mode, and that acquires intermittent reception timing information in a communication device of a reception side, which is returned in response to receiving of the data frame from the communication device the transmission side, wherein (1) a synchronization information storage section stores at least an interval between past two transmissions in the synchronous communication mode, and a correction amount that depends on the interval between the two transmissions and is for correcting the intermittent reception timing information of the earlier transmission of the two, (2) in a case in which a new data frame is required to transmit, an intermittent reception timing information correction section corrects previous intermittent reception timing information based on a ratio between the transmission interval stored in the synchronization information storage section and an interval between the current and previous transmissions, and the correction amount stored in the synchronization information storage section, and (3) a transmission timing determination section estimates an intermittent reception timing in the communication device of the reception side based on the corrected previous intermittent reception timing information, and determines a timing of transmitting a wakeup frame on current transmission.

A third aspect is a communication program that causes a computer mounted on a communication device of a transmission side, in which a period for transmitting wakeup frames that are transmitted prior to transmitting data frames is longer in an asynchronous communication mode than in a synchronous communication mode, and that acquires intermittent reception timing information in a communication device of a reception side, which is returned in response to receiving a data frame from the communication device of the transmission side, the communication program causes the computer to function as (1) a synchronization information storage section for storing at least an interval between past two transmissions in the synchronous communication mode, and a correction amount that depends on the interval between the two transmissions and is for correcting the intermittent reception timing information of the earlier transmission of the two, (2) an intermittent reception timing information correction section that, in a case in which a new data frame is required to transmit, corrects previous intermittent reception timing information based on a ratio between the transmission interval stored in the synchronization information storage section and an interval between the current and previous transmissions, and the correction amount stored in the synchronization information storage section, and (3) a transmission timing determination section that estimates an intermittent reception timing in the communication device of the reception side based on the corrected previous intermittent reception timing information, and determining a timing of transmitting a wakeup frame on current transmission.

A fourth aspect is a communication system including a communication device of a transmission side that transmits wakeup frames prior to transmitting data frames, and a communication device of a reception side that changes from sleep state to reception standby state only during a startup time, which is intermittently caused for each reception period, and receives a frame from the communication device of the transmission-side during the startup time, and that transmits intermittent reception timing information to the communication device of the transmission side when receiving a data frame, wherein a communication modes include a synchronous communication mode and an asynchronous communication mode, and a wakeup frame transmission period is longer in the asynchronous communication mode than in the synchronous communication mode, the communication device is applied as the communication device of the transmission side.

Accordingly the above aspects may keep synchronous communication even with a long data frame transmission interval.

BRIEF DESCRIPTION OF THE DRAWINGS

Exemplary embodiments will be described in detail based on the following figures, wherein:

FIG. 2 is an diagram illustrating synchronization information stored in a synchronization information storage section in the communication device according to the first exemplary embodiment;

DETAILED DESCRIPTION (A) First Exemplary Embodiment

Hereinafter a first exemplary embodiment of a communication device, a communication device synchronization method, a communication program, and a communication system will be described with reference to the drawings.

The communication device according to the first exemplary embodiment is a wireless communication device conforming the CSL. The communication system according to the first exemplary embodiment is configured by including plural communication devices according to the first exemplary embodiment. Note that the communication device will be called "node" in the following description.

(A-1) Configuration of First Exemplary Embodiment

Figure 1:
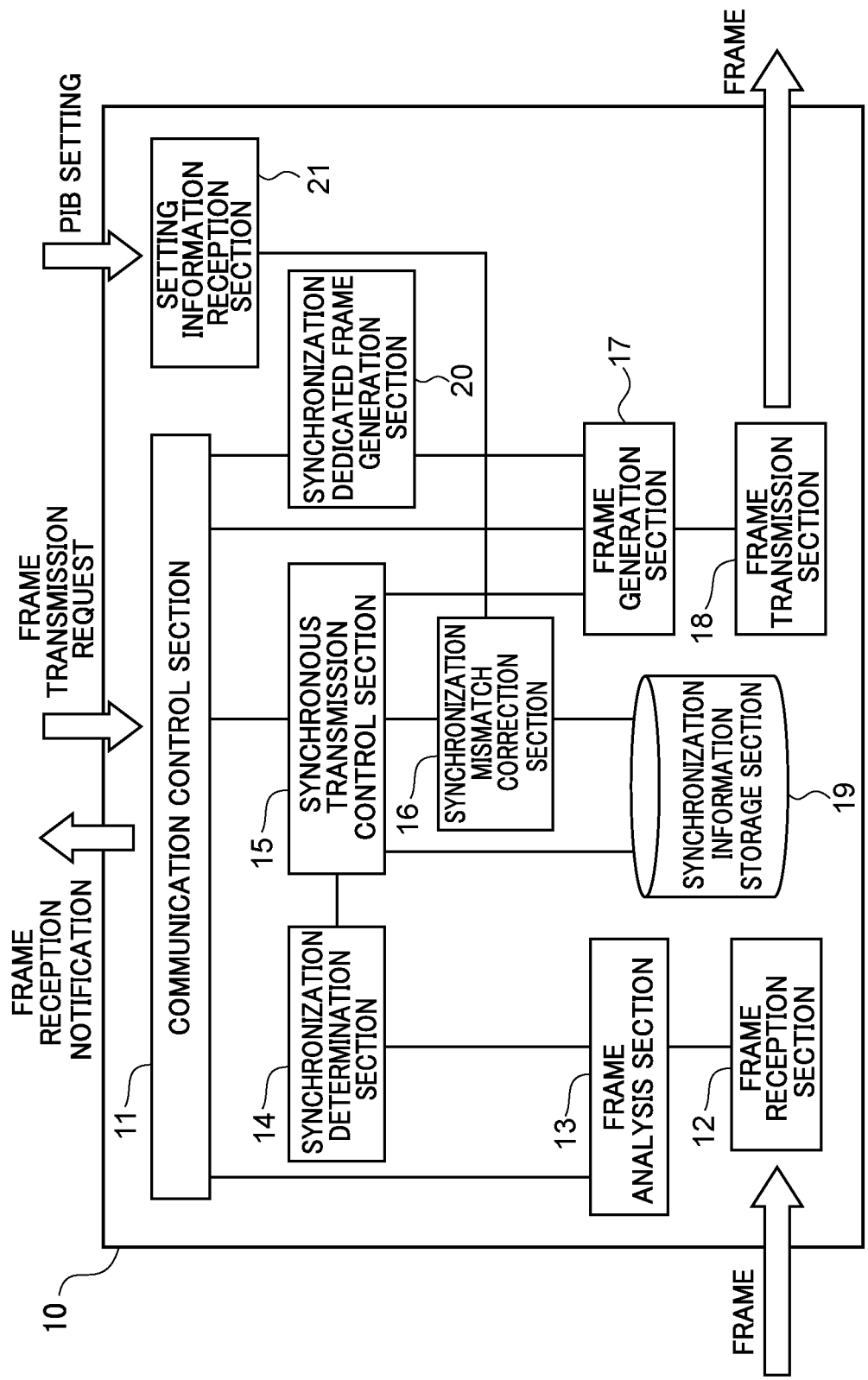
FIG. 1 is a block diagram illustrating a configuration of a communication device according to a first exemplary embodiment.

FIG. 1 is a block diagram illustrating a configuration of the communication device according to the first exemplary embodiment which may be a transmission node or a reception node.

The communication device according to the first exemplary embodiment includes an antenna, an RF reception section, and an RF transmission section; however, sections that may be configured by hardware only are omitted in FIG. 1. The communication device according to the first exemplary embodiment may be configured by implementing the components of FIG. 1 by hardware, or may be implemented by an CPU and a software (communication program) executed by the CPU. In any cases, the communication device according to the first exemplary embodiment may be functionally illustrated as in FIG. 1.

In FIG. 1, the communication device (node) 10 includes a communication control section 11, a frame reception section 12, a frame analysis section 13, a synchronization determination section 14, a synchronous transmission control section 15, a synchronization mismatch correction section 16, a frame generation section 17, a frame transmission section 18, a synchronization information storage section 19, a synchronization dedicated frame generation section 20, and a setting information reception section 21.

The communication control section 11 controls to transmit data frames or to transmit wakeup frames prior to the data frames, in a case in which a frame transmission request is input from an upper-layer processing section (not illustrated). Further, the communication control section 11 notifies a transmission result to the upper-layer processing section or notifies reception of a reception acknowledge signal (ACK) or data frame to the upper-layer processing section.

The communication control section 11 transmits a wakeup frame under control of the synchronous transmission control section 15 in a case in which a frame transmission request is input. Further, the communication control section 11 issues a data frame transmission request to the frame generation section 17 after a wakeup frame transmission complete notification is input from the synchronous transmission control section 15.

In a case in which a transmission error has occurred, the communication control section 11 requests the synchronization dedicated frame generation section 20 to generate a dedicated frame for synchronization. A format of the dedicated frame for synchronization is not limited. For example, an empty data frame with no payload may be applied as the dedicated frame for synchronization.

The frame reception section 12 receives frames, such as wakeup frames, data frames and dedicated frames for synchronization, that have arrived to the communication device 10 of itself (note that the destination is not limited to the communication device of itself), and sends the received frames to the frame analysis section 13.

The frame analysis section 13 analyzes the received frames, discards the frames if the received frames are not destined to the communication device 10 of itself, and sends the frames to the communication control section 11 and the synchronization determination section 14 if the received frames are destined to the communication device 10 of itself.

The synchronization determination section 14 determines a synchronized state between the communication device 10 of itself and a destination node of the frames under control of the synchronous transmission control section 15. For example, the synchronization determination section 14, under control of the synchronous transmission control section 15, starts monitoring of receiving of a reception acknowledge frame, monitors whether a reception acknowledge frame has been received within a predetermined period from the start, and transmits the result to the synchronous transmission control section 15.

In a case in which the synchronous transmission control section 15 is instructed to transmit a wakeup frame from the communication control section 11, the synchronous transmission control section 15 determines a transmission time and a transmission period of the wakeup frame, based on the information stored in the synchronization information storage section 19 or based on the CSL phase corrected by the synchronization mismatch correction section 16. Then, the synchronous transmission control section 15 sends a wakeup frame transmission request to the frame generation section 17 according to the determination result. Further, in a case in which the transmission of the wakeup frame in response to the current frame transmission request is completed, the synchronous transmission control section 15 sends a wakeup frame transmission complete notification to the communication control section 11, and instructs the synchronization determination section 14 to monitor receipt of a reception acknowledge frame in consideration of subsequent transmission of the data frame.

Under control of the synchronous transmission control section 15, in order to respond to the current frame transmission request, the synchronization mismatch correction section 16 appropriately corrects the CSL phase by using information stored in the synchronization information storage section 19 and information such as current time, and sends the corrected CSL phase to the synchronous transmission control section 15. Note that, though omitted in FIG. 1, a clock (internal clock) for counting the current time based on an internally-generated clock is provided inside the communication device 10.

In a case in which a frame transmission request (a wakeup frame transmission request, a data frame transmission request or a dedicated frame for synchronization transmission request) is input, the frame generation section 17 generates and sends a transmission frame to the frame transmission section 18.

The frame transmission section 18 transmits a transmission frame to a wireless space (wireless network). As described above, the communication device 10 of the present exemplary embodiment is assumed as a wireless communication device. However, the communication device 10 may be a component that configures a wired network, and in such case, the frame transmission section 18 transmits a transmission frame to the wired network.

The synchronization information storage section 19 stores one synchronization information for each synchronization destination node. For example, a destination node is identified by use of the address (communication address) of the node. The synchronization information is information such as whether the nodes are in the synchronous communication mode, information of past transmissions of wakeup frames, and the like.

FIG. 2 is an explanatory diagram illustrating an example of the synchronization information that are stored in the synchronization information storage section 19 in time sequence. The column "time" in FIG. 2 is illustrated for convenient description, and does not configure the synchronization information. One row of synchronization information illustrated in FIG. 2 is stored at a time. For example, only the first row of synchronization information is stored after time ts1 and before time te1, only the third row of synchronization information is stored after time te1 and before time te2, and only the fourth row of synchronization information is stored after time te2 and before ts3, and so on.

The synchronization information includes, for example, maximum transmission interval F2, the correction amount F3 at maximum transmission interval, CSL phase F4, and last transmission time F5, and is associated with destination address F1. Note that, an effective value in the CSL phase F4 indicates that a reception acknowledge frame has been received, and the nodes have been in the synchronous communication mode.

The synchronization dedicated frame generation section 20 generates the dedicated frame for synchronization under control of the communication control section 11, and sends a frame transmission request for the dedicated frame for synchronization to the frame generation section 17.

The setting information reception section 21 receives setting information that is used in the communication device 10 from outside of the communication device 10. For example, the setting information reception section 21 receive setting information by applying a setting information reception function included in a database such as PIB (Personal Area Network Information Base) defined in the IEEE 802. 15. 4. Whether the synchronization mismatch correction section 16 corrects the CSL phase or not is set in the setting information reception section 21 from the outside. Further, whether to make the entire communication device 10 in the CSL communication mode or not is set in the setting information reception section 21 from the outside.

(A-2) Operations of First Exemplary Embodiment

The transmission operations of the communication device 10 according to the first exemplary embodiment will be described below with reference to the drawings.

Figure 3:
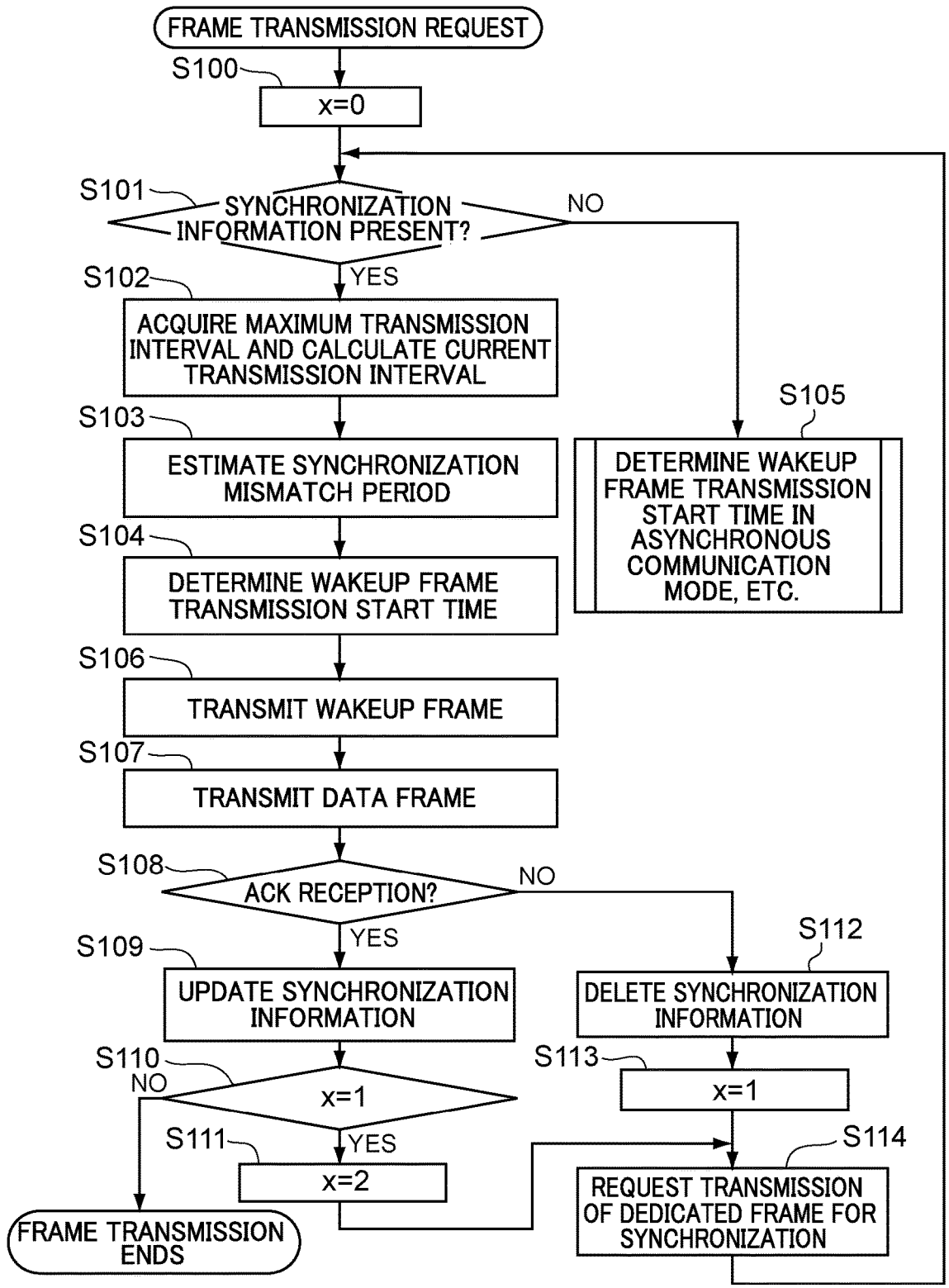
FIG. 3 is a flowchart illustrating the operations in a case in which a frame transmission request is sent from an upper-layer processing section to the communication device according to the first exemplary embodiment.

FIG. 3 is a flowchart illustrating the operations of the communication device 10 in a case in which the communication device 10 is in the CSL communication mode and a frame transmission request is input from the upper-layer processing section.

The communication device 10 according to the first exemplary embodiment performs the operations that are unlike the conventional communication device when operating as a transmission node, and performs almost the same as the conventional communication device when operating as a reception node, and thus, the operations as a transmission node will be mainly described below.

In a case in which the communication device 10 is in the CSL communication mode and a data frame transmission request is input from the upper-layer processing section, the communication device 10 starts the processings as illustrated in FIG. 3. The communication control section 11 in the communication device 10 that has been input with the frame transmission request sets a frequency parameter X, which is a number of times for discriminating a data frame and a dedicated frame for synchronization, to 0, so as to indicate an actual data frame (step S100). Then, the communication control section 11 sends the address of a destination node to the synchronous transmission control section 15, to cause the synchronous transmission control section 15 to search the synchronization information storage section 19, and confirms whether or not the synchronization information in association with the address of the destination node is stored in the synchronization information storage section 19 (namely, confirms whether or not the communication device 10 and the destination node are in the synchronized state) (step S101).

The synchronization mismatch correction section 16, which is notified from the synchronous transmission control section 15 that the communication device 10 and the destination node are in the synchronized state, reads a past maximum transmission interval $t_{max}$ of the destination address from the synchronization information storage section 19, and calculates an interval between a previous frame transmission time $t_{last}$ and a current time $t_{now}$ (a transmission interval up to current transmission (which will be called current transmission interval)) (step S102). The synchronization mismatch correction section 16 then corrects the previous CSL phase CSLPhase$_{last}$ as in Equation (1) based on the information of the past maximum transmission interval $t_{max}$, the amount of corrected synchronization CSLPhase$_{max}$, and the transmission interval between the previous frame transmission time $t_{last}$ and the current time $t_{now}$, and sends the corrected CSLPhase$_{re}$ to the synchronous transmission control section 15 (step S103). The first term in the right side in Equation (1) is the correction amount depending on the transmission interval (the correction amount at the maximum transmission interval illustrated in FIG. 2 can be also calculated similarly), and the corrected CSLPhase$_{re}$ is acquired by adding thereto the previous CSL phase CSLPhase$_{last}$. The correction amount corresponds to an estimated synchronization mismatch period for the transmission interval in consideration with a difference between the internal clocks of the communication device 10 and the destination node. The previous CSL phase CSLPhase$_{last}$ is not always corrected, and may be corrected only in a case in which the current transmission interval $t_{now}-t_{last}$ is equal to or more than a threshold. The threshold used in this way may be, for example, previously set via the setting information reception section 21.

$$CSLPhase_{re}=CSLPhase_{max}\text{max}*(t_{now}-t_{last})/t_{max}+CSLPhase_{last} \quad (1)$$

The synchronous transmission control section 15 calculates a next wakeup frame transmission start time by using the corrected CSL phase value CSLPhase$_{re}$ (step S104).

In a case in which the result that the communication device 10 and the destination node are not in the synchronized state is acquired, the communication control section 11 assumes that both the communication device 10 and the destination node are in the asynchronous communication mode, and determines a next wakeup frame transmission start time (a current time, for example) according to the determination method in the asynchronous communication mode (step S105).

The synchronous transmission control section 15 repeatedly sends a wakeup frame transmission request to the frame generation section 17 to generate a wakeup frame, during the predetermined wakeup frame transmission period or the maximum wakeup frame transmission period from the wakeup frame transmission start time determined in step S104 or step S105, and causes the frame transmission section 18 to repeatedly transmit wakeup frames (step S106).

In a case in which the repeated transmissions of wakeup frames ends, the synchronous transmission control section 15 notifies the communication control section 11 thereof, and thus the communication control section 11 immediately sends a data frame transmission request to the frame generation section 17 to generate a data frame, and causes the frame transmission section 18 to transmit the data frame (step S107). In the first half of the processing in step S107, a confirmation is made as to whether a frame to be transmitted is an actual data frame or a dedicated frame for synchronization, based on the parameter X. In a case in which the parameter X defines a dedicated frame for synchronization, in step S107, the communication control section 11 sends the dedicated frame for synchronization transmission request to the synchronization frame generation section 20 to generate the dedicated frame for synchronization, sends the generated dedicated frame for synchronization to the frame transmission section 18 via the frame generation section 17, and causes the frame transmission section 18 to transmit the dedicated frame for synchronization.

The communication control section 11 (or the synchronization determination section 14) waits to receive, from the frame analysis section 13, the notification that the frame analysis section 13 has received a reception acknowledge frame (ACK frame) from the destination node of the data frame (or the dedicated frame for synchronization) (step S108). Herein, in a case in which a reception acknowledge frame does not arrive within a predetermined period from the data frame (or the dedicated frame for synchronization) transmission, it is determined that a reception acknowledge frame cannot be received (even in a case in which a reception acknowledge frame arrives after the predetermined period, the frame is handled as "non-receivable"). An information transmission line is not illustrated in the drawings; however, for example, information regarding reception of the reception acknowledge frame is sent from the communication control section 11 to the synchronization determination section 14.

In a case in which the reception acknowledge frame is received, the synchronous transmission control section 15 updates the synchronization information of the destination node in the synchronization information storage section 19, depending on a determination result of the synchronized state between the communication device 10 and the destination node by the synchronization determination section 14. Further, the communication control section 11 sends a frame reception notification, indicating that the reception acknowledge frame has been received, in response to the frame transmission request to the upper layer (step S109).

The synchronization information update method in the above case will be described below. The CSL phase CSL-Phase in the reception acknowledge frame is overwritten on the CSL phase $CSLPhase_{last}$ of the destination node in the synchronization information storage section 19. Further, in a case in which a current transmission interval $t_{now}-t_{last}$, which is the interval between a previous frame transmission time $t_{last}$ and a current time $t_{now}$, is longer than the maximum transmission interval $t_{max}$ of the destination address stored in the synchronization information storage section 19, the maximum transmission interval $t_{max}$ of the destination address in the synchronization information storage section 19 is updated to the current transmission interval $t_{now}-t_{last}$. Further, the correction amount $CSLPhase_{max}$ at the maximum transmission interval, which is a phase corresponding to the maximum transmission interval $t_{max}$, is updated to a value obtained by adding the correction amount $CSLPhase_{re}$ achieved in step S103 to the CSL phase value CSLPhase in the reception acknowledge frame.

In a case in which the update of the synchronization information ends, a determination is made as to whether or not the second transmission of the dedicated frame for synchronization is required, based on a value of the parameter X (step S110). Namely, a determination is made as to whether or not the current data frame successfully transmitted is an actual data frame or the first dedicated frame for synchronization or the second dedicated frame for synchronization. In a case in which the successfully transmitted current data frame is an actual data frame or the second dedicated frame for synchronization, the communication device 10 returns to the state of waiting for a new data frame transmission request from the upper-layer processing section. On the other hand, in a case in which the successfully transmitted current data frame is the first dedicated frame for synchronization, the value of the parameter X is updated to the value indicating the second dedicated frame for synchronization, and the processing proceeds to step S114 after a dedicated frame for synchronization transmission standby time elapses.

On the other hand, the synchronous transmission control section 15 that has received the determination result, indicating that a reception acknowledge frame for the transmission of the data frame (or the dedicated frame for synchronization) cannot be received and is not in the synchronized state, from the synchronization determination section 14, deletes the synchronization information of the destination node in the synchronization information storage section 19 (step S112). The synchronization information may not be immediately deleted in a case in which the first reception acknowledge frame cannot be received, and the synchronization information may be deleted in a case in which a reception acknowledge frame cannot be received even when retransmission of the data frames have been repeated for a predetermined number of times. A report to the upper-layer processing section from the communication control section 11 may be made each time when the reception acknowledge frame cannot be received, or may be reported as one result in response to the transmission request based on the retransmission results.

Thereafter, the communication control section 11 updates the value of the parameter X to the value indicating the first dedicated frame for synchronization, and proceeds to step S114. In step S114, the communication control section 11 generates an X-th dedicated frame for synchronization transmission request, and returns to the processing in step S101.

As described above, in a case in which the destination node cannot receive the reception acknowledge frame in response to the transmission of the data frame (the actual data frame or the dedicated frame for synchronization), the dedicated frame for synchronization is transmitted twice to the destination node, and the synchronization information is re-examined per transmission. For example, the first transmission of a dedicated frame for synchronization is performed immediately after it is determined that the destination node cannot receive the reception acknowledge frame in response to the transmission of a data frame. The second transmission of the dedicated frame for synchronization is performed when the dedicated frame for synchronization transmission standby time (the standby time may be determined by any method, and an average time between two times $t_{max}$ and $t_{now}-t_{last}$ may be applied), which is longer than the maximum transmission time $t_{max}$ in the synchronization information storage section 19 and shorter than the current transmission interval $t_{now}-t_{last}$, has elapsed from the first transmission. However, in a case in which a transmission error is notified to the upper-layer processing section, the first transmission of the dedicated frame for synchronization may be omitted, when the data frame transmission request is immediately made to the same destination from the upper-layer processing section.

Here, the dedicated frame for synchronization is transmitted twice in a case in which a reception acknowledge frame cannot be received, since the maximum transmission interval in the synchronization information and the correction amount at the maximum transmission interval cannot be acquired by only one transmission of the dedicated frame for synchronization. Thus, the maximum transmission interval and the correction amount at the maximum transmission interval can be acquired by two transmissions of the dedicated frame for synchronization.

Note that the dedicated frame for synchronization is a data frame for acquiring the synchronization information, and thus, the payload thereof may be empty. The destination node transmits the reception acknowledge frame also when receiving the dedicated frame for synchronization (not illustrated), but the dedicated frame for synchronization is handled as an invalid data frame (discarded, for example).

The dedicated frame for synchronization is transmitted in order to receive the reception acknowledge frame in response to the transmission of the dedicated frame for synchronization, thereby to update the synchronization information and in order to perform the correction described in Equation (1) for transmitting the data frame in the future, even in a case in which the reception acknowledge frame in response to the original transmission of a data frame cannot be received.

Hereinafter, the processings illustrated in FIG. 3 will be explained ideationally. Firstly, an error (synchronization mismatch) occurred in a short time between the internal clocks of the communication device 10 and the destination node is examined. Then, an error in the long time is predicted in a case in which a long time has elapsed from transmission of the previous data frame, a wakeup frame transmission start time is determined based on the prediction, and the transmission is started. In a case in which the transmission interval is long and has become the asynchronous communication mode, such as in a case in which the reception acknowledge frame does not arrive from the destination node in response to the data frame transmission, the dedicated frame for synchronization is transmitted during the data frame transmission interval so as to examine an error at the time interval in the internal clocks of the communication device 10 and the destination node, and the information of the error is kept ready to be used for transmitting the actual data frame thereafter.

Figure 4:
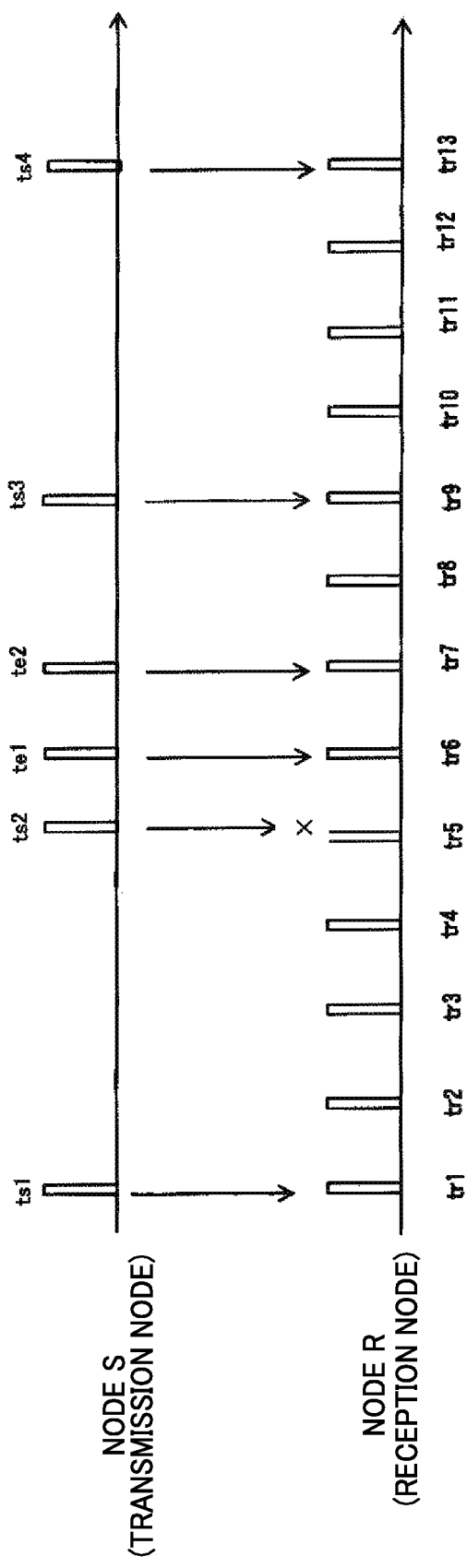
FIG. 4 is a timing chart used for explaining specific operations of the communication device according to the first exemplary embodiment.
Figure 5:
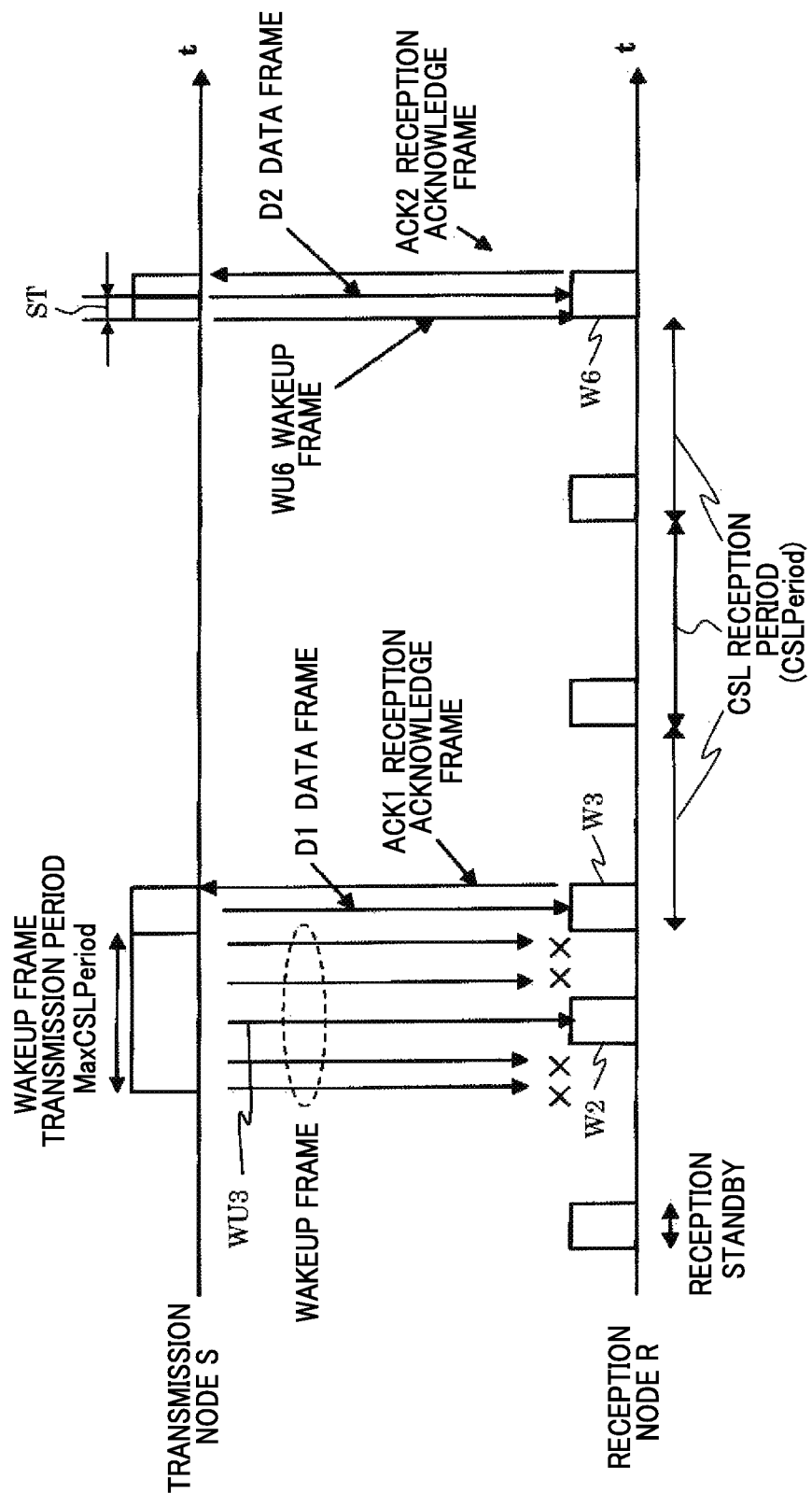
FIG. 5 is a timing chart illustrating an outline of data communication operations in CSL.
Figure 6:
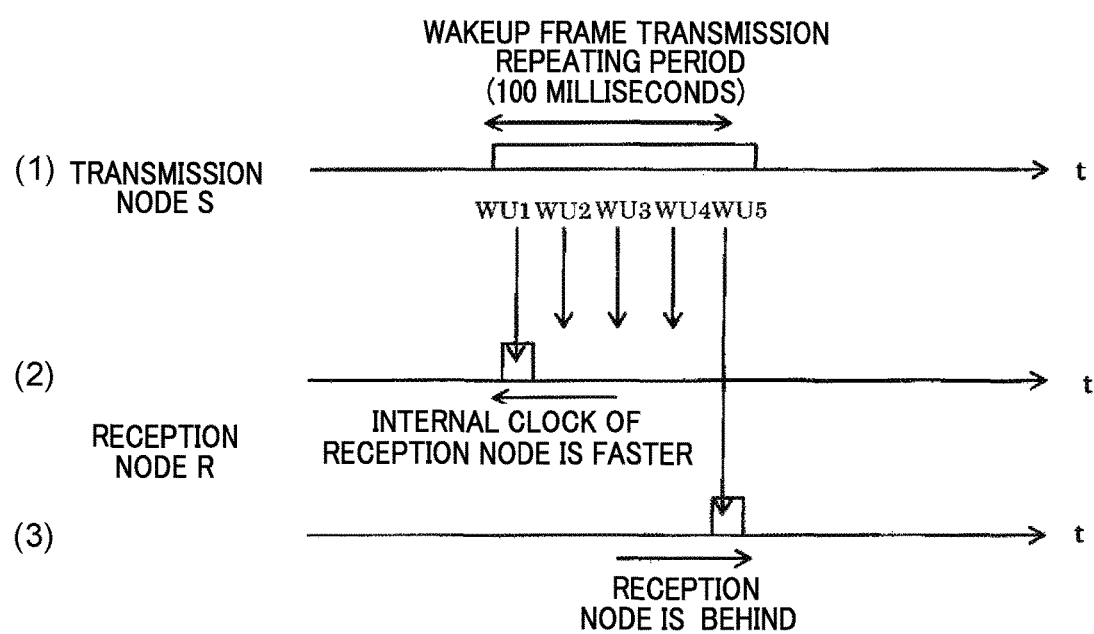
FIG. 6 is a timing chart for explaining an operation of a conventional communication device.

The operations of the communication device 10 according to the first exemplary embodiment will be described below by use of specific examples. FIG. 4 is a timing chart used for the description, and illustrates a case in which frames are transmitted from the node S to the node R in the CSL communication mode.

The node S on the transmission side (which will be called transmission node below) transmits a data frame (and a wakeup frame prior thereto) to a node R on the reception side (which will be called reception node below) at times ts1, ts2, . . . . At times te1, te2, . . . , the transmission node S transmits the dedicated frame for synchronization (and the wakeup frame prior thereto) in order to adjust a timing with the reception node. Note that, "Time" is used in FIG. 4, however, correctly speaking, the time is a period of time required for transmitting the data frame and the wakeup frame prior thereto, and, in FIG. 4, the time (for example, the time of transmission of the first wakeup frame) representatively describes the period of time. Further, "Time" indicates a predetermined width of time also for the reception node R. The reception node R starts up (waits for reception) per timing of the CSL reception periods such as times tr1, tr2, . . . . In the chapter 5. 1. 11 of the IEEE Std 802. 15. 4e-2012, it is defined that the CSL reception period is on the order of one second, however, for easy description, the description will be made assuming that the CSL reception period is 10 minutes.

FIG. 2 illustrates the synchronization information stored in the synchronization information storage section 19 at times ts1, ts2, te1, te2, ts3, ts4 in FIG. 4. Changes in the synchronization information as illustrated in FIG. 2 will be described below.

At time ts1, a case in which the actual data frame is transmitted from the transmission node S to the reception node R, as illustrated in the first row (row with time "ts1") of FIG. 2, the synchronization information storage section 19 stores therein the CSL phase (0.1 in the example of FIG. 2) in the reception acknowledge frame as CSL phase and the current time ts1 as last transmission time, in association with the destination address 2222 of the node R.

In a case in which that new transmission is required at time ts2 at a lapse of about 40 minutes from the previous transmission time ts1, and in a case in which the transmission node S that has transmitted a frame to the reception node R but failed since synchronization between the both of the nodes S and R is not established (Namely, a case in which the transmission node S cannot receive a reception acknowledge frame), the synchronization information is deleted, and thus the contents of the synchronization information storage section 19 at time ts2 are only the destination address.

Since the transmission node S fails to transmit a frame (the transmission node S cannot receive the reception acknowledge frame), the first transmission of the dedicated frame for synchronization is performed at next transmission time te1. In a case in which synchronization is established again to successfully transmit a frame in the frame transmission at time te1, the synchronization information storage section 19 stores the CSL phase (0 in the example of FIG. 2) in the reception acknowledge frame as CSL phase, and the current time te1 as last transmission time, in association with the destination address 2222 of the node R, as illustrated in the third row (row with time "te1") in FIG. 2. In the above case, a case in which the dedicated frame for synchronization is transmitted at time te1, has been described. However, the data frame, which has previously failed to be transmitted, is likely to be retransmitted at current time te1 in response to an instruction from the upper-layer processing section, and, for example, in such case, the first transmission of the dedicated frame for synchronization is omitted.

Thereafter, the second transmission of the dedicated frame for synchronization is performed at time te2. In a case in which the second transmission of the dedicated frame for synchronization is successfully transmitted, the contents of the synchronization information storage section 19 are updated. In a case in which the frame transmission interval between the previous transmission time te1 and the current transmission time te2 is 10 minutes, a maximum transmission interval of 10 minutes is stored in the synchronization information storage section 19. Further, the current transmission interval is the first effective interval for the maximum transmission interval, and thus a CSL phase value of 0.1 in the current reception acknowledge frame is stored as the correction amount at the maximum transmission interval. The CSL phase of 0.1 in the reception acknowledge frame at the current transmission is stored as the CSL phase, and the current time te2 is stored as the last transmission time.

For example, in a case in which a new frame (actual data frame) is required to transmit at time ts3 when about 20 minutes has elapsed from the previous transmission time te2, by using the information in the synchronization information storage section 19, the amount of corrected CSL phase at a transmission interval of 20 minutes becomes 0.2 seconds, as indicated in the first term in the right side in Equation (2) in which specific values are applied to Equation (1) Then, 0.1 seconds in the CSL phase in the previous reception acknowledge frame is added thereto, and thus, a corrected CSL phase CSLPhase$_{re}$ of 0.3 seconds is acquired. The achieved corrected CSL phase CSLPhase$_{re}$ is applied as the CSL phase to determine the frame transmission time.

$$CSLPhase_{re}=0.1\times(20/10)+0.1=0.3 \qquad (2)$$

Since the current transmission interval (20 minutes) is longer than the maximum transmission interval (10 minutes) in the synchronization information storage section 19, the CSL phase and the last transmission time corresponding to the destination address 2222 are updated and the maximum transmission interval and the correction amount at the maximum transmission interval are also updated in response to reception of the reception acknowledge frame. Since the corrected CSL phase CSLPhase$_{re}$ is applied to determine the frame transmission time for synchronization, the CSL phase in the reception acknowledge frame, which is currently returned, becomes a very low value (FIG. 2 illustrates the case of 0 second).

In a case in which a new frame (actual data frame) is required to be transmitted at time ts4 when about 40 minutes has elapsed from the previous transmission time ts3, by using the information in the synchronization information storage section 19, the amount of corrected CSL phase at a transmission interval of 40 minutes becomes 0.4 seconds, as indicated in the first term in the right side in Equation (3) in which specific values are applied to Equation (1). Then, 0 second in the CSL phase in the previous reception acknowledge frame is added thereto, and thus, a corrected CSL phase $CSLPhase_{re}$ of 0.4 seconds is acquired. The achieved corrected CSL Phase $CSLPhase_{re}$ is applied as the CSL phase to determine the frame transmission time.

$$CSLPhase_{re}=0.2\times(40/20)+0=0.4 \quad (3)$$

Since the current transmission interval (40 minutes) is longer than the maximum transmission interval (20 minutes) in the synchronization information storage section 19, the CSL phase and the last transmission time corresponding to the destination address 2222 are updated and the maximum transmission interval and the correction amount at the maximum transmission interval are also updated in response to reception of the reception acknowledge frame. Since the corrected CSL phase $CSLPhase_{re}$ is applied to determine the frame transmission time for synchronization, the CSL phase in the reception acknowledge frame, which is currently returned, becomes a very low value (FIG. 2 illustrates the case of 0 second).

As described above, at time ts4, the amount of synchronization mismatch (corrected CSL phase) that may occur in the current transmission, which is 40 minutes interval from the previous transmission, is predicated, by taking into account of the amount of synchronization mismatch (particularly the correction amount) at a maximum transmission interval of 20 minutes in the previous transmission, and the predicated amount is reflected to the frame transmission time. Like at time ts2 that has the same transmission interval of 40 minutes, a transmission error caused by synchronization mismatch more rarely occurs in a case in which the amount of synchronization mismatch at the previous maximum transmission interval is considered and is reflected on the frame transmission time, than in a case in which only the CSL phase in previous transmission at time ts1 is used for predicting the amount of synchronization mismatch and is reflected on a frame transmission time.

The example of FIG. 4 describes a case in which the frame is transmitted with a long transmission interval. According to a conventional method, a transmission error is likely to cause an error also in the next transmission. On the other hand, according to the first exemplary embodiment, in a case in which a transmission error occurs, the dedicated frame for synchronization is transmitted twice with a predetermined transmission interval (an interval between times te1 and te2), and synchronization mismatch at the predetermined transmission interval is examined. Accordingly, even in a case in which the frame is transmitted with a longer transmission interval than the predetermined transmission interval (a frame is transmitted at time ts3 or time ts4), the frame is likely to be successfully transmitted.

(A-3) Effects of First Exemplary Embodiment

According to the first exemplary embodiment, the following effects may be obtained.

According to the first exemplary embodiment, a relationship between the past frame transmission interval and the correction amount for correcting the synchronization mismatch is stored, a correction amount for correcting the synchronization mismatch for use in current frame transmission interval is predicted based on a difference between the current frame transmission interval and the stored frame transmission interval, and a frame transmission time is determined based on the prediction. Accordingly, the first exemplary embodiment may properly correct the synchronization mismatch that may occur in a long frame transmission interval, and may increase successful frame transmission. Namely, in first exemplary embodiment, errors caused by synchronization mismatch between the transmission node and the reception node may be further decreased and a time to keep in the synchronous communication mode may be longer than conventional communication devices. Consequently, in first exemplary embodiment, the number of times of retransmitting data frames or transmitting a large number of wakeup frames in the asynchronous communication mode may be reduced.

Further, according to the first exemplary embodiment, the amount of synchronization mismatch at a predetermined transmission interval is detected by use of the dedicated frame for synchronization in a case in which a transmission error occurs, and thus the synchronous communication mode may be kept even with a long data transmission interval after the detection.

(B) Other Embodiments

In the description of the first exemplary embodiment, other modified exemplary embodiments have been described, however, hereinafter, further modified exemplary embodiments will be described.

The block diagram (FIG. 1) used for explaining the first exemplary embodiment describes the minimum functions required for synchronous communication, and the communication device may include function other than the synchronous communication function.

In the first exemplary embodiment, a case in which the transmission interval (maximum transmission interval) relating to the correction amount to be stored in the synchronization information storage section is an interval between tandem transmissions, has been described. However, in a case in which a condition, such as a shorter transmission interval than a predetermined threshold, is met, the transmission interval between two transmissions with one or two transmissions therebetween, and the correction amount thereof, may be stored in the synchronization information storage section.

In the first exemplary embodiment, a case in which the correction amount stored in the synchronization information storage section for calculating the correction amount with a current transmission interval is the correction amount with the maximum transmission interval in the past, has been described. However, the stored correction amount does not need to be limited to the maximum transmission interval, and the correction amount for a past transmission interval may be employed. For example, even in a case in which a transmission interval between two transmissions of the dedicated frame for synchronization is not the past maximum transmission interval, the correction amount with the interval between two transmissions of the dedicated frame for synchronization may be used for calculating the correction amount at the current transmission interval.

In the first exemplary embodiment, a case in which the second transmission of the dedicated frame for synchronization is always performed, has been described. However, in a case in which the actual data frame transmission request is made after the first transmission of the dedicated frame for synchronization and before the second transmission of the dedicated frame for synchronization, transmission of the data frame in response to the transmission request may be handled as the second transmission of the dedicated frame for synchronization.

In the first exemplary embodiment, a case in which the retransmission of the actual data frame is handled as the first transmission of the dedicated frame for synchronization, has been described. However, two transmissions of the actual data frame may be handled as two transmissions of the dedicated frame for synchronization.

In the first exemplary embodiment, a case in which the dedicated frame for synchronization is transmitted twice when a transmission error occurs, has been described. However, the dedicated frame for synchronization may be transmitted at a proper timing even when a transmission error has not occurred. For example, in the synchronous communication mode in which previous frame has been successfully transmitted, the dedicated frame for synchronization may be once transmitted when a predetermined dummy transmission startup time has elapsed from the previous transmission of a frame, and the correction amount may be acquired at the dummy transmission startup time as a transmission interval and may be used for subsequent frame transmission.

In the first exemplary embodiment, an explanation has given in a case in which the wakeup frame and the data frame are definitely identified from each other. However, a frame that serves as both the wakeup frame and the data frame may be applied as the respective frames.

In the first exemplary embodiment, a case in which the communication device is compatible with the CSL communication mode has been described. However, the present disclosure may be applied to a communication device compatible with the CSL communication mode and a communication mode other than the CSL communication mode and may be capable of switching the communication modes.

In the first exemplary embodiment, a case in which the communication device is compatible with the CSL communication mode has been described. However, the present disclosure may be applied to a communication device compatible with any other similar synchronous communication mode.

In the first exemplary embodiment, a case in which the communication device includes both the transmission configuration and the reception configuration for data frames has been described. However, the communication device according to the present disclosure may be applied to a reception-dedicated communication device or a transmission-dedicated communication device.

In the above exemplary embodiments, a case in which the nodes configuring a sensor network has been described. However, the applications of the communication device according to the present disclosure are not limited to the sensor network.

What is claimed is:

1. A communication device, comprising:
   a reception section that receives information relating to a reception timing at a reception side, which is transmitted from a transmission destination after a data frame is transmitted to the transmission destination;
   an information storage section that stores at least a transmission interval and the information relating to the reception timing for one or more previous transmissions, in a synchronous communication mode;
   a mismatch correction section that, in a case in which a new data frame is to be transmitted, calculates a correction amount for eliminating a mismatch in a transmission timing of a wakeup frame that is transmitted prior to the new data frame or a mismatch in a reception timing at which the transmission destination receives the wakeup frame, based on at least the transmission interval and the information relating to the reception timing; and
   a communication control section that determines the transmission timing or the reception timing based on the information relating to the reception timing and the correction amount.

2. The communication device according to claim 1, further comprising a synchronization dedicated frame generation section that generates a dedicated frame for synchronization of a communication device at the transmission destination so as to eliminate the mismatch in the reception timing at a timing when data to be transmitted is not generated.

3. The communication device according to claim 1, wherein, in a case in which a new transmission interval is longer than a past transmission interval that is stored in the information storage section, the information storage section updates the stored transmission interval as the new transmission interval.

4. The communication device according to claim 1, wherein:
   in a case in which a transmission interval between a current transmission for transmitting a new data frame and a previous transmission is equal to or less than a predetermined threshold, the mismatch correction section does not correct the previous information relating to the reception timing; and
   in a case in which a new transmission interval is equal to or less than a predetermined threshold, the communication control section determines a transmission timing of a current wakeup frame based on the previous non-corrected information relating to the reception timing.

5. The communication device according to claim 1, wherein the information storage section stores the correction amount calculated by the mismatch correction section.

6. The communication device according to claim 1, wherein the wakeup frame transmission period is longer in an asynchronous communication mode than in the synchronous communication mode.

7. The communication device according to claim 1, wherein:
   the mismatch in the transmission timing is derived by comparing a potential transmission timing at which transmission is expected, with an actual timing indicating an actual transmission timing; and
   the mismatch in the reception timing is derived by comparing a potential reception timing at which reception by the transmission destination is expected, with an actual timing indicating an actual reception timing.

8. The communication device according to claim 1, wherein the information related to the reception timing includes the mismatch in the reception timing and the mismatch in the reception timing is derived by comparing a potential reception timing at which reception by the transmission destination is expected, with an actual timing indicating an actual reception timing.

9. The communication device according to claim 1, wherein information that indicates the mismatch in the reception timing is CSL phase.

10. A communication method, comprising:
    receiving information relating to a reception timing at a reception side, which is transmitted from a transmission destination after a data frame is transmitted to the transmission destination;

storing at least a transmission interval and the information relating to the reception timing for one or more previous transmissions in a synchronous communication mode;

calculating, in a case in which a new data frame is to be transmitted, a correction amount for eliminating a mismatch in a transmission timing for a wakeup frame that is transmitted prior to the new data frame or a mismatch in a reception timing at which the transmission destination receives the wakeup frame, based on at least the transmission interval and the information relating to the reception timing; and determining the transmission timing or the reception timing based on the information relating to the reception timing and the correction amount.

11. A non-transitory computer readable medium comprising instructions for execution by a control portion of a communication device, the instructions comprising:

receiving information relating to a reception timing at a reception side, which is transmitted from a transmission destination after a data frame is transmitted to the transmission destination;

storing at least a transmission interval and the information relating to the reception timing for one or more previous transmissions in a synchronous communication mode;

calculating, in a case in which a new data frame is to be transmitted, a correction amount for eliminating a mismatch in a transmission timing for a wakeup frame that is transmitted prior to the new data frame or a mismatch in a reception timing at which the transmission destination receives the wakeup frame, based on at least the transmission interval and the information relating to the reception timing; and determining the transmission timing or the reception timing based on the information relating to the reception timing and the correction amount.

* * * * *